(12) United States Patent
Ryan et al.

(10) Patent No.: US 11,446,658 B2
(45) Date of Patent: Sep. 20, 2022

(54) MICROFLUIDIC DEVICE

(71) Applicant: EPIGEM LIMITED, Yorkshire (GB)

(72) Inventors: Timothy George Ryan, Middlesborough (GB); Philip Summersgill, Yorkshire (GB); Simon Allen, Yorkshire (GB); Andrew Baker, Hartlepool (GB)

(73) Assignee: EPIGEM LIMITED, Redcar Yorkshire (GB)

( * ) Notice: Subject to any disclaimer, the term of this patent is extended or adjusted under 35 U.S.C. 154(b) by 3 days.

(21) Appl. No.: 16/492,761

(22) PCT Filed: Mar. 12, 2018

(86) PCT No.: PCT/EP2018/056125
§ 371 (c)(1),
(2) Date: Sep. 10, 2019

(87) PCT Pub. No.: WO2018/162765
PCT Pub. Date: Sep. 13, 2018

(65) Prior Publication Data
US 2020/0070159 A1    Mar. 5, 2020

(30) Foreign Application Priority Data
Mar. 10, 2017    (GB) ..................... 1703874

(51) Int. Cl.
*B01L 3/00*        (2006.01)
*B01L 7/00*        (2006.01)
(Continued)

(52) U.S. Cl.
CPC .......... *B01L 3/502715* (2013.01); *B01L 7/00* (2013.01); *G01N 30/6091* (2013.01);
(Continued)

(58) Field of Classification Search
CPC .. B01L 3/502715; B01L 3/5027; B01L 3/502; B01L 3/50; B01L 7/00; G01N 30/6091; G01N 30/60; G01N 30/02
(Continued)

(56) References Cited

U.S. PATENT DOCUMENTS

| 5,817,470 A | 10/1998 | Burzio |
| 5,928,880 A * | 7/1999 | Wilding .............. B01F 15/0264 435/7.21 |

(Continued)

FOREIGN PATENT DOCUMENTS

| DE | 102011086235 A1 | 5/2013 |
| EP | 2070594 A1 | 6/2009 |

(Continued)

OTHER PUBLICATIONS

British Search Report for corresponding application GB1703874.6; Report dated Sep. 11, 2017.
(Continued)

*Primary Examiner* — Christine T Mui
(74) *Attorney, Agent, or Firm* — Cantor Colburn LLP

(57) ABSTRACT

A microfluidic device has a cavity in which a functionalized mesh is arranged in a layered configuration to provide a high surface area. The cavity is housed in a body that is easily configured for sample flow to concentrate the analyte, heat release of the analyte from the mesh, and elution of the released analyte. The microfluidic device can be used in a variety of applications by functionalizing the mesh with a suitable affinity media.

23 Claims, 14 Drawing Sheets

(51) Int. Cl.
  *G01N 30/60* (2006.01)
  *G01N 30/88* (2006.01)
(52) U.S. Cl.
  CPC .................. *B01L 2300/0627* (2013.01); *B01L 2300/0681* (2013.01); *B01L 2300/0832* (2013.01); *B01L 2300/12* (2013.01); *B01L 2300/1805* (2013.01); *G01N 2030/8831* (2013.01)
(58) Field of Classification Search
  USPC .......................................... 422/502, 500, 50
  See application file for complete search history.

(56) References Cited

U.S. PATENT DOCUMENTS

| | | | |
|---|---|---|---|
| 7,292,667 | B1 | 11/2007 | Beriont |
| 2005/0201924 | A1* | 9/2005 | Ramani ................. C01B 17/046 423/576.8 |
| 2007/0272000 | A1 | 11/2007 | Kahl |
| 2009/0294385 | A1* | 12/2009 | Tajima .................. B01L 3/0275 210/101 |
| 2011/0097215 | A1 | 4/2011 | O'Shaughnessy |
| 2014/0349279 | A1 | 11/2014 | Berthelot |
| 2016/0082435 | A1 | 3/2016 | Bunner |
| 2016/0158755 | A1 | 6/2016 | Jeon |

FOREIGN PATENT DOCUMENTS

| | | |
|---|---|---|
| KR | 20120042518 A | 5/2012 |
| WO | 2004022233 A1 | 3/2004 |
| WO | 2007066110 A1 | 6/2007 |
| WO | 2013028848 A1 | 2/2013 |
| WO | 2013142847 A1 | 9/2013 |

OTHER PUBLICATIONS

International Search Report for corresponding application PCT/EP2018/056125 filed Mar. 12, 2018; dated Jun. 18, 2018.
Written Opinion for corresponding application PCT/EP2018/056125 filed Mar. 12, 2018; dated Jun. 18, 2018.

* cited by examiner

MICROFLUIDIC DEVICE

FIELD OF THE INVENTION

The invention relates to a microfluidic device. The invention has particular use in chromatography applications and may also have utility in applications where 3d microfluidics is useful, such as organ-on-a-chip applications.

BACKGROUND AND PRIOR ART

Liquid chromatography is a technique for the separation of an analyte from a solution. Various forms of liquid chromatography exist, including affinity chromatography and ion-exchange chromatography. Affinity chromatography is typically used for the separation of biochemical analytes, in which an affinity media is selected to have affinity with the analyte of interest. Ion-exchange chromatography separates ions and polar molecules based on their affinity to the ion exchanger, such as a resin with a functional group.

There are some applications where it would be beneficial to be able to perform testing using liquid chromatography techniques in a field environment. One example is the detection of aflatoxin in milk. Milk is collected from a number of dairy farms and processed at a dairy processing facility before distribution for sale. Dairy processing facilities collect and blend milk from a number of dairy farms. Aflatoxin testing is usually only performed at the dairy processing facility, although testing could also be performed at a dairy farm. Testing at the dairy processing facility does not allow identification of whether a specific dairy farm is a source of aflatoxin, since blended milk is tested.

SUMMARY OF THE INVENTION

In accordance with one aspect of this invention, there is provided a microfluidic device having a cavity defining microfluidic volume, comprising:
- a mesh provided in the cavity, the mesh having a plurality of apertures and an outer surface;
- the mesh arranged in a layered configuration with the apertures of adjacent layers offset with respect to one another to define a plurality of circuitous pathways therethrough;
- the outer surface of the mesh having a functionalizing material applied thereto.

Preferably, the ratio of a surface area of the outer surface of the mesh to the microfluidic volume is in the region of 20-4000 $mm^{-1}$.

In one arrangement, the mesh is formed into a spiral to form the layered configuration.

In another arrangement, a plurality of meshes are provided in the cavity to form the layered configuration. Preferably, the device further comprises a plurality of groups of meshes, each group of meshes have a different functionalizing material applied thereto.

In one arrangement, the plurality of meshes is comprised of a first mesh having a first pitch and a first aperture size, and a second mesh having a second pitch and a second aperture size, wherein the first and second meshes are interleaved. Preferably, the plurality of meshes is further comprised of a third mesh having a third pitch and a third aperture size, the first, second and third meshes being interleaved.

In another arrangement, the each mesh comprises a plurality of apertures having a ranges of sizes and shapes. The apertures in each mesh may be arranged in a grid, whereby the grid of one mesh is rotated with respect to the grid of an adjacent mesh.

Preferably, the plurality of meshes is formed into a stack. A plurality of stacks of meshes may be provided, the stacks being held apart by spacing elements provided between the stacks. Preferably, each stack comprises at least 15 meshes.

In one arrangement, the cavity defines a microfluidic volume of 5-500 µL.

The functionalizing material applied to the meshes may be selected from the group comprising: phenolic compounds, catechol, gallates, catechin compounds, mussel adhesive protein, antigens including peptide epitopes, aptamers and antibodies, polymer syntheses using DOPA and dopamine derivatives, copolymers formed from acetonide-protected dopamine methacrylamide (ADMA) and one of methyl methacrylate, stearyl methacrylate, glycidyl methacrylate, hydroxyethyl methacrylate and polyethylene glycol methacrylate (PEG methacrylate).

The microfluidic device may further comprise first and second manifold blocks, a body provided between the manifold blocks, the cavity being provided in the body, at least two inlets and at least two outlets provided in the manifold blocks, the inlets and outlets being in fluid communication with the cavity via microfluidic pathways.

Preferably, heating means are provided adjacent to the cavity. The heating means may comprise first and second heaters provided in the first and second manifold blocks, respectively, each heater having a corresponding heating plate provided in the first and second manifold blocks, the heating plates being in thermal contact with the body.

The inlets and outlets may be provided in pairs comprising one inlet and one outlet, one of the inlet and the outlet in each pair provided in the first manifold block and the other provided in the second manifold block, the inlet and the outlet in each pair being aligned, the body being movable between each aligned pair.

In one arrangement, the inlets comprise a sample inlet, a buffer inlet and an elution inlet, and the outlets comprise a sample outlet, a buffer outlet and an elution outlet, to provide a sample pair, a buffer pair and an elution pair.

The first and second heaters may also be aligned, the inlet and outlet pairs and the heaters arranged to form the sequence sample pair, buffer pair, heaters, and elution.

The manifold block may include at least one sensor integrated therein. The sensors may be optical, magnetic, thermal, and/or chemical.

In one arrangement, the sample inlet, buffer inlet and elution outlet are provided in the first manifold block and the sample outlet, buffer outlet and elution inlet are provided in the second manifold block.

BRIEF DESCRIPTION OF THE FIGURES

Embodiments of the disclosure will now be described, by way of example, with reference to the accompanying drawings in which.

DETAILED DESCRIPTION

Figure 1:
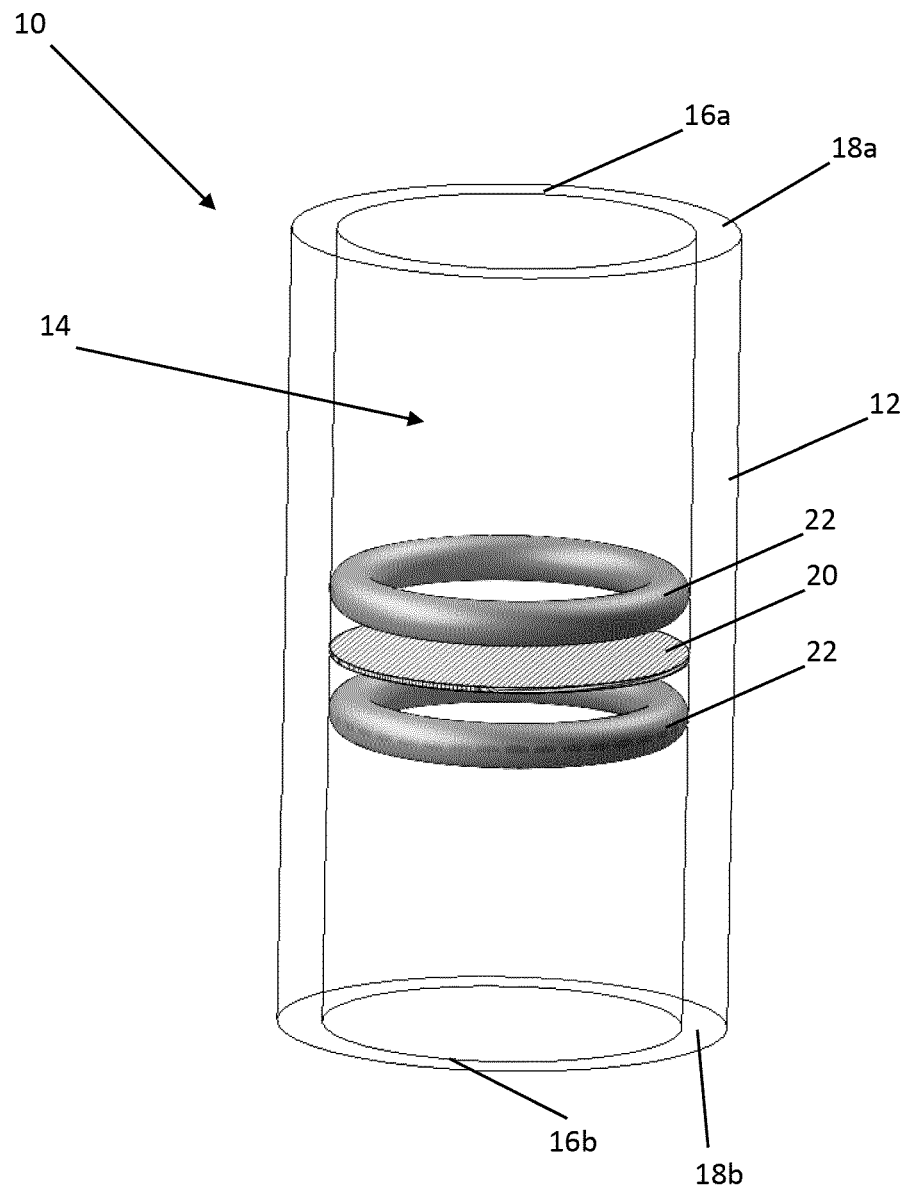
FIG. 1 illustrates a microfluidic device according to one embodiment of the disclosure.

FIG. 1 shows a microfluidic device 10 according to one embodiment of the disclosure. The microfluidic device 10 comprises a body 12 in which a cavity 14 is formed. The cavity 14 defines a microfluidic volume of 5-500 µL, although in other embodiments larger or smaller volumes may be used as required. The cavity 14 extends through the body 12 to define first and second openings 16a, 16b at ends 18a, 18b of the body 12.

In the embodiment shown in FIG. 1, a plurality of meshes 20 are provided in the cavity 14. The meshes 20 are arranged in a layered configuration as will be described in more detail below. The meshes 20 are held in place between gaskets 22. The gaskets 22 also ensure a fluid passes through the meshes 20 rather than around any gap between the meshes 20 and the body 12.

Examples arrangements of meshes 20 are shown in FIG. 2A-2D. Each mesh 20 has a plurality of apertures 24 formed therein and an outer surface 26. The apertures 24 of adjacent meshes 20 are offset with respect to one another to define a plurality of circuitous pathways therethrough. The meshes 20 shown in FIG. 2A-2C have a diameter in the range of 3.5-6.5 mm, however other sizes may be used.

Figure 2A:
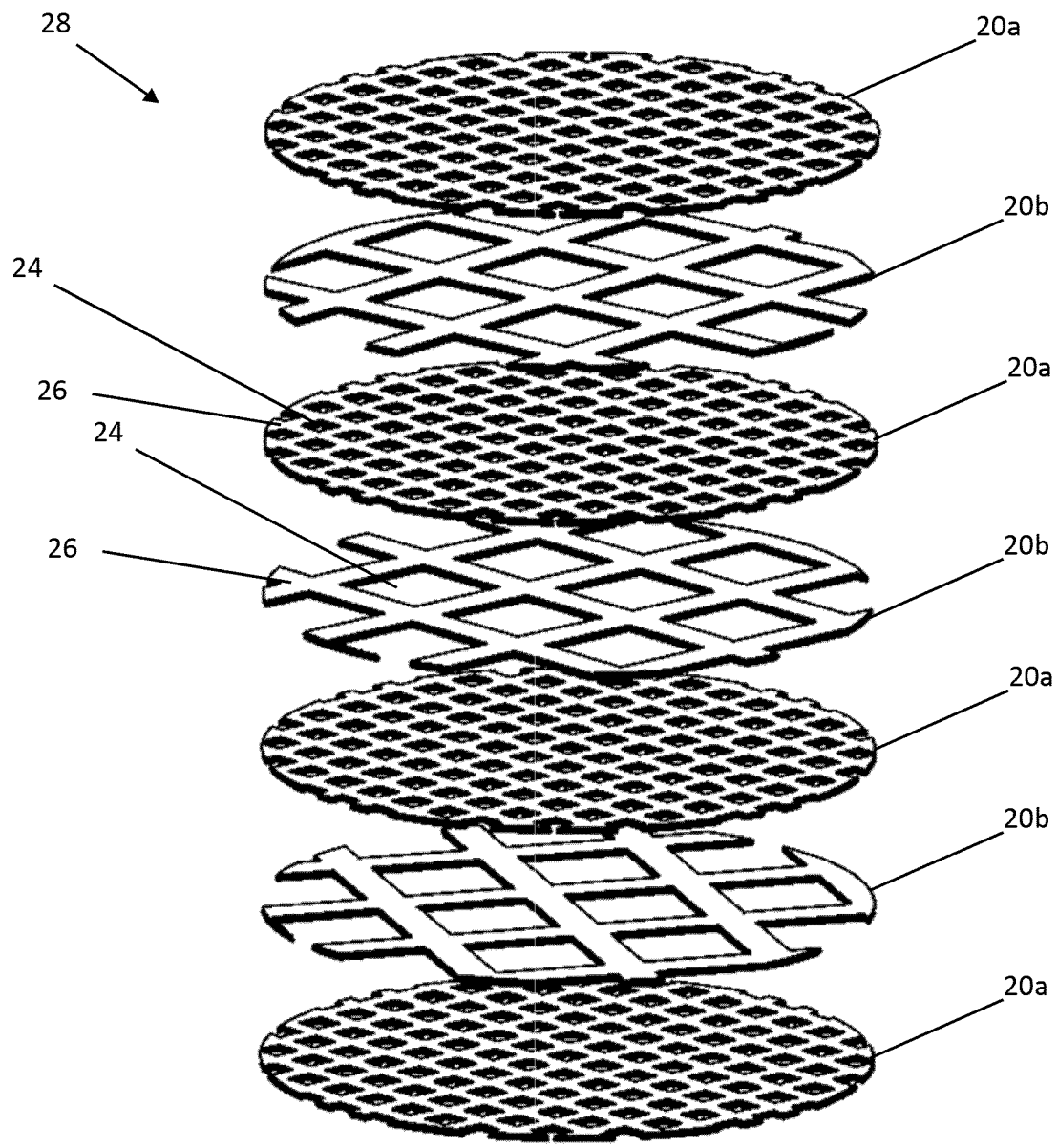
FIG. 2A to 2D show arrangements of meshes used in microfluidic devices of the disclosure.
Figure 2B:
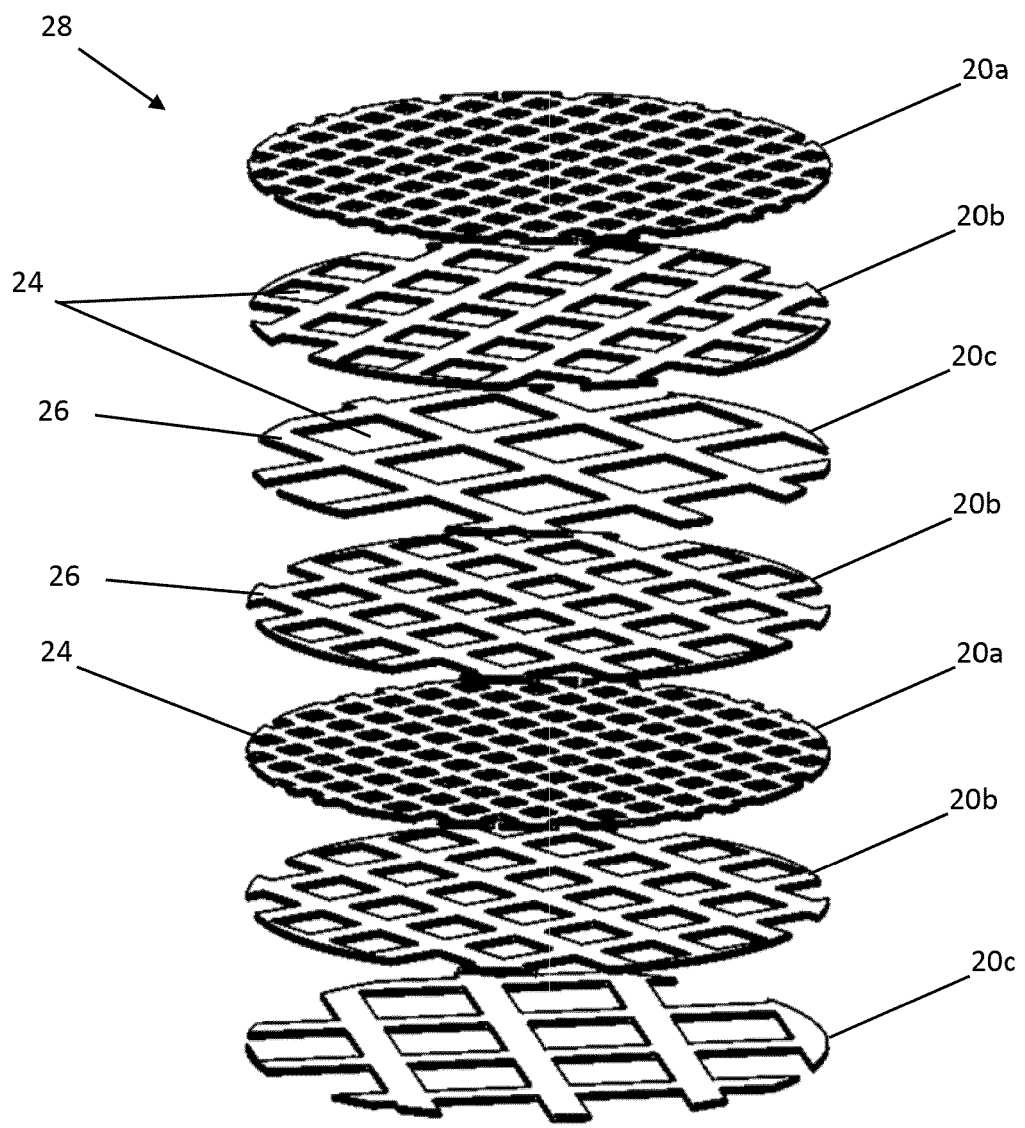
Figure 2C:
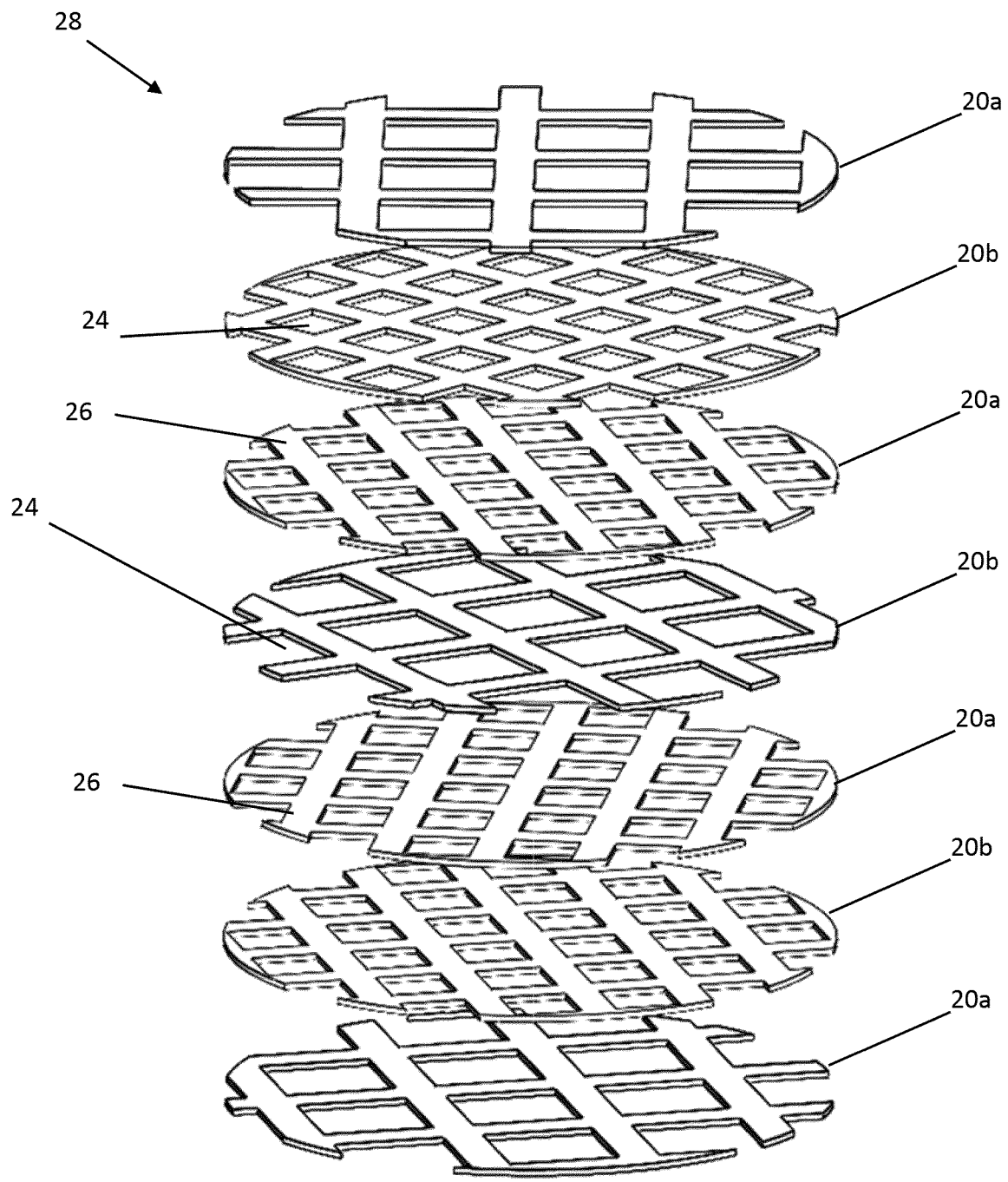

The arrangements of meshes 20 shown in FIGS. 2A and 2C are each comprised of a first mesh 20a in which the apertures 24 have a first aperture size and are spaced apart at a first pitch, and a second mesh 20b in which the apertures 24 have a second aperture size and are spaced apart at a second pitch. The arrangement of FIG. 2B further comprises a third mesh 20c in which the apertures 24 have a third aperture size and are spaced apart at a third pitch. Example values for the pitch and aperture size of the first, second and third meshes shown in FIG. 2A-2C are set out below in Table 1.

TABLE 1

|                     | FIG. 2A | FIG. 2B | FIG. 2C |
| --- | --- | --- | --- |
| First pitch         | 50 µm   | 50 µm   | 150 µm  |
| First aperture size | 28 µm   | 28 µm   | 106 µm  |
| Second pitch        | 150 µm  | 100 µm  | 100 µm  |
| Second aperture size| 106 µm  | 65 µm   | 65 µm   |
| Third pitch         | —       | 150 µm  | —       |
| Third aperture size | —       | 106 µm  | —       |

As shown in FIG. 2A-2C, the first, second and third meshes 20a-20c are interleaved. Other arrangements that those shown in the drawings are possible, for instance the order and quantity of meshes 20a-20c could be varied and may even be random. The meshes 20 may be formed of any suitable material, including nickel, ceramic, polymers, rubber, gold or other suitable metal, or a composite of materials. In some embodiments, the meshes 20 may be formed from one of several materials and arranged in an order according to the type of material. For instance, meshes 20 may be formed from a metal such as nickel or a ceramic, and arranged in a layered configuration such that the meshes formed of nickel and ceramic are interleaved. Other materials may be used for the meshes according to requirements, and the number of meshes and interleave order may be varied.

Each mesh 20a-20c is shown with one size of aperture 24 formed therein, while in other embodiments the apertures formed in each mesh may have a range of sizes and/or shapes. Further, other shapes than those shown in the drawings are possible. For example, the apertures in each mesh may have a porosity gradient or other configuration to provide a uniform interaction between the analyte and the outer surface of the meshes. The apertures 24 in each mesh 20 are arranged in a grid in the examples shown in the drawings, however other arrangements of apertures may be used. It is preferred that one mesh is rotated with respect to an adjacent mesh, as most clearly shown in FIG. 2C.

Figure 2D:
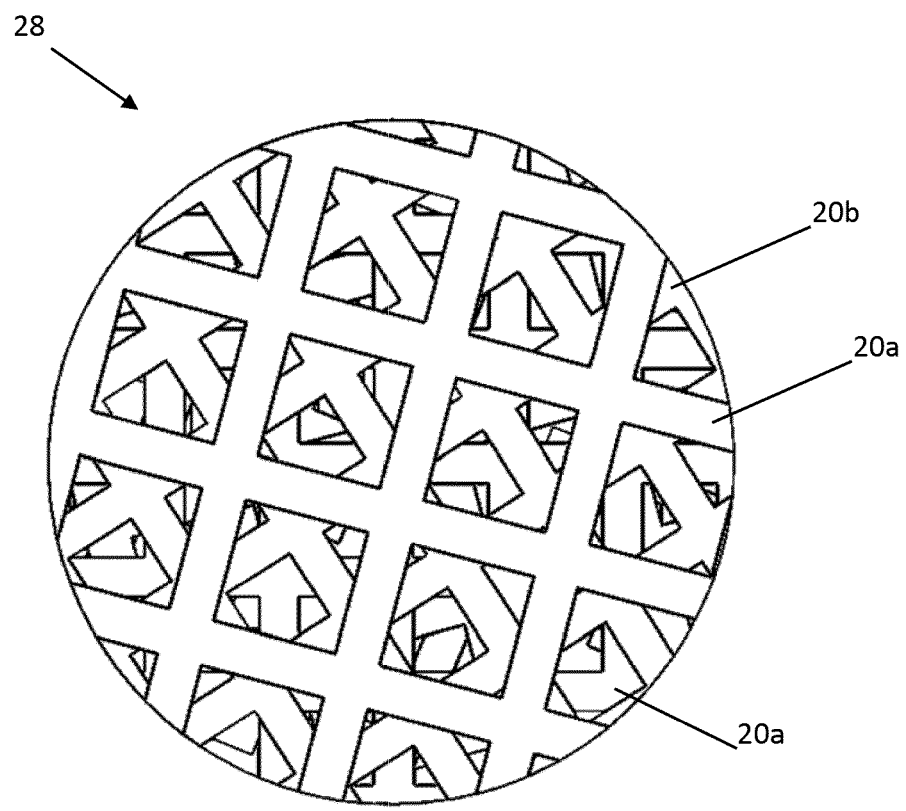

The apertures 24 define a plurality of circuitous pathways through the meshes 20, as can be seen in FIG. 2D which is a top view of the meshes 20 in FIG. 2C. The layering and rotating of meshes is considered to enhance this effect since the apertures of adjacent meshes will not be aligned, encouraging transverse movement of a fluid passing through the meshes 20. The plurality of meshes 20 is formed into a stack 28, which in the embodiment shown in FIG. 1 may consist of 15-50 meshes.

The meshes 20 provide a large surface area which is beneficial as described below. The ratio of a surface area of the outer surfaces 26 of the plurality of meshes 20 to the microfluidic volume may be in the region of 20-4000 mm$^{-1}$ depending on the proportion of the cavity 14 filled with meshes.

In other embodiments, a single mesh may be provided in the cavity 14 and formed into a spiral to form the layered configuration, for instance by rolling.

Returning now to FIG. 1, a functionalizing material (not shown) is applied to the outer surface 26 of the plurality of meshes 20. Any suitable functionalizing material known to those in the art may be used according to the application. The functionalizing material may be applied to the meshes 20 in any preferred manner. Conveniently, however, the microfluidic device 10 is itself suitable for the application of functionalizing material, for instance by washing a solution containing the functionalizing material through the microfluidic device 10. Where the microfluidic device 10 is to be used in an affinity concentrator application, example functionalizing materials include phenolic compounds, catechol, catechin compounds, mussel adhesive protein and polymer syntheses using DOPA and dopamine derivatives. As would be appreciated by those in the art, the functionalizing material would be chosen to be suitable to the material that the mesh is made from. In some embodiments meshes made from different materials may be used in one device. Further, multiple different functional materials may be used, for example one group of meshes may have a first functionalizing material and a second group of meshes may have a second functionalizing material. More than two groups may be used. Such arrangements offers the possibility of microfluidic devices with multi-parameter test capability. Further examples of functionalizing materials are described in more detail below.

Figure 3A:
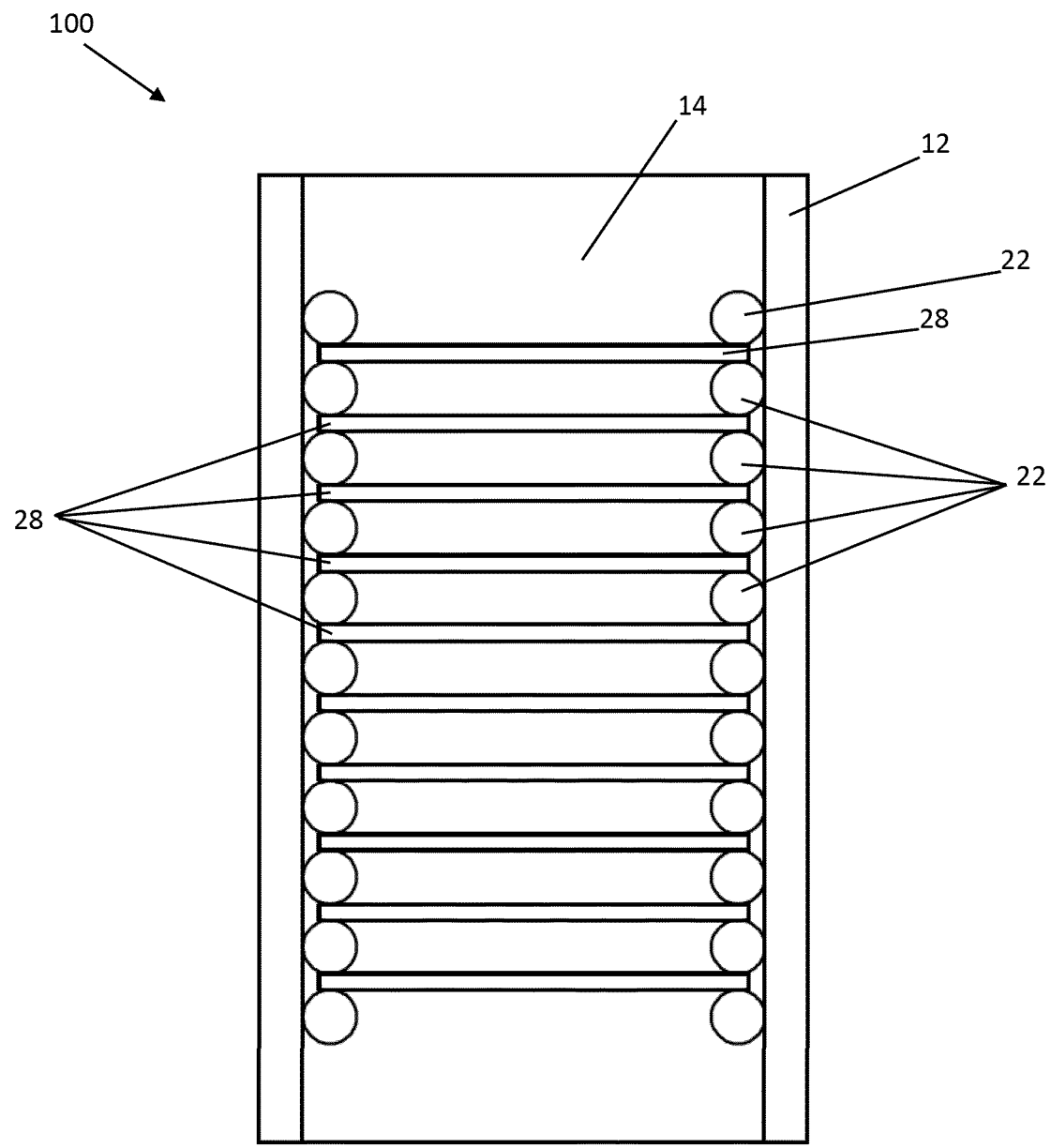
FIGS. 3A and 3B is a cross section view of a microfluidic device according to another embodiment of the disclosure.
Figure 3B:
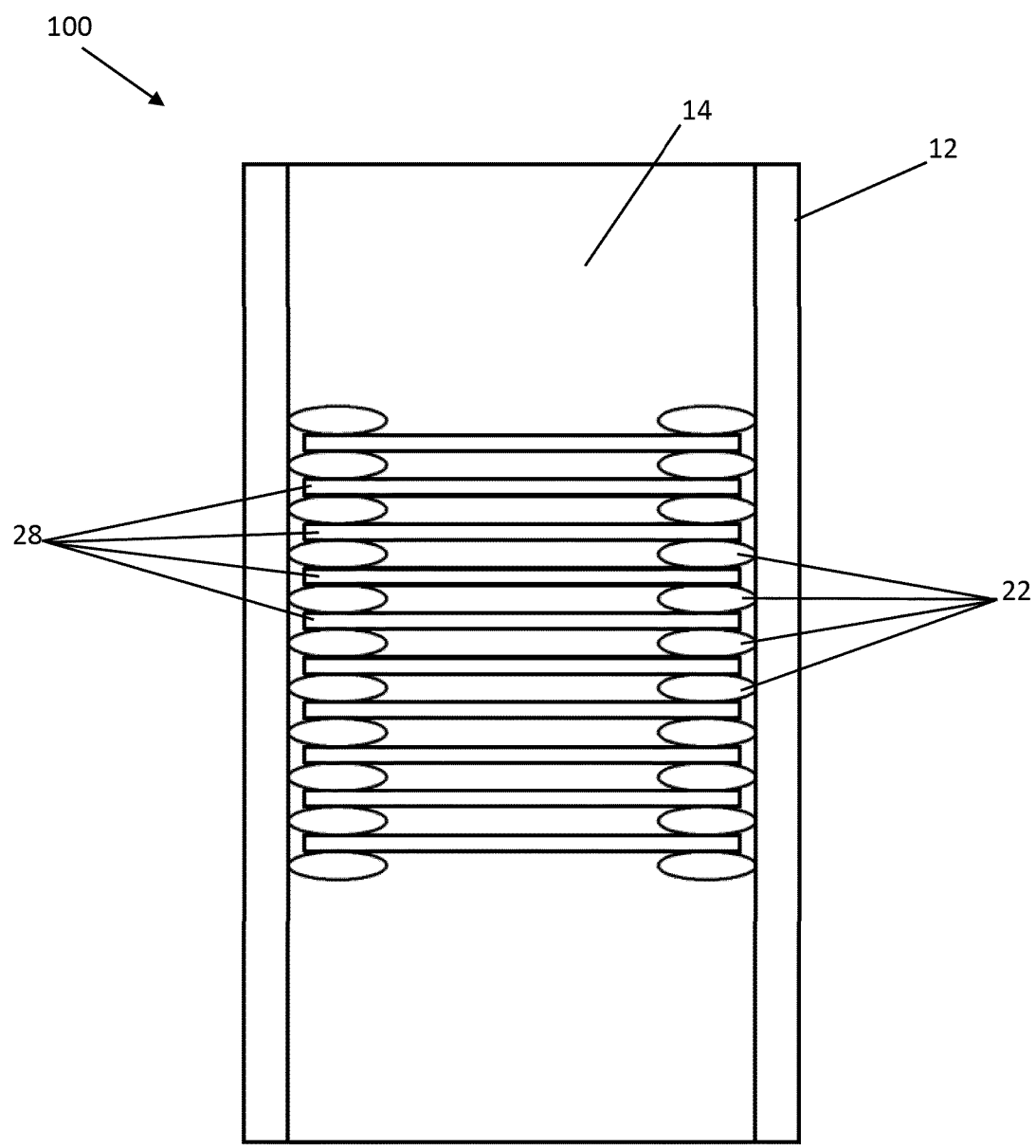

Referring now to FIGS. 3A & 3B, a microfluidic device 100 according to another embodiment of the disclosure is shown, with like reference numerals denoting like parts to those of the first embodiment. The microfluidic device 100 is similar to the microfluidic device 10, with the exception that a plurality of stacks 28 are provided in the cavity 14 of the microfluidic device 100. The stacks 28 are held apart by spacing elements in the form of gaskets 22 provided between the stacks 28. In one arrangement, the gaskets 22 may be formed of a compressible material, enabling the stacks 28 to be provided closer together as shown in FIG. 3B. In other embodiments gasket may be formed on the mesh by any suitable process, such as additive processes, printing, or lithography. For example, the gaskets may be formed of photoresist and included on the mesh by lithography.

Providing multiple stacks 28 increases the total surface area of the meshes 20. In some embodiments, some or all of the gaskets 22 could be omitted and replaced with further meshes. As the number of meshes increase, the volume in the cavity occupied by the meshes will increase. The number of meshes 20 chosen for a particular application, the pitch and aperture sizes of the meshes and the volume of the cavity 14 will be chosen according to factors including the desired concentration to be achieved in affinity applications, any back pressure constraints of other devices such as pumps or connectors, and a desired volume of elude to be obtained from the cavity 14.

Figure 4:
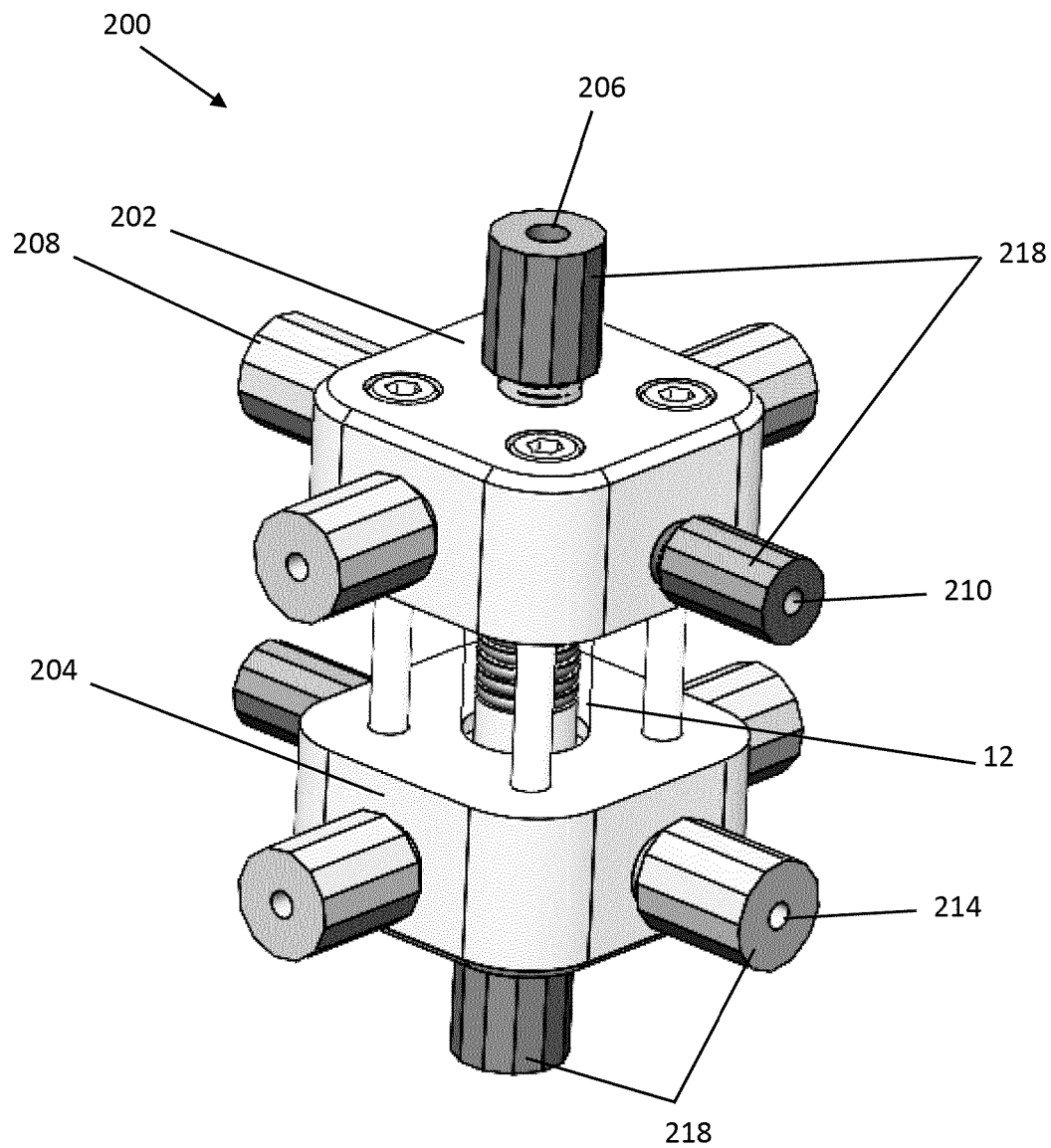
FIG. 4 is a side view of a microfluidic device according to another embodiment of the disclosure.
Figure 5:
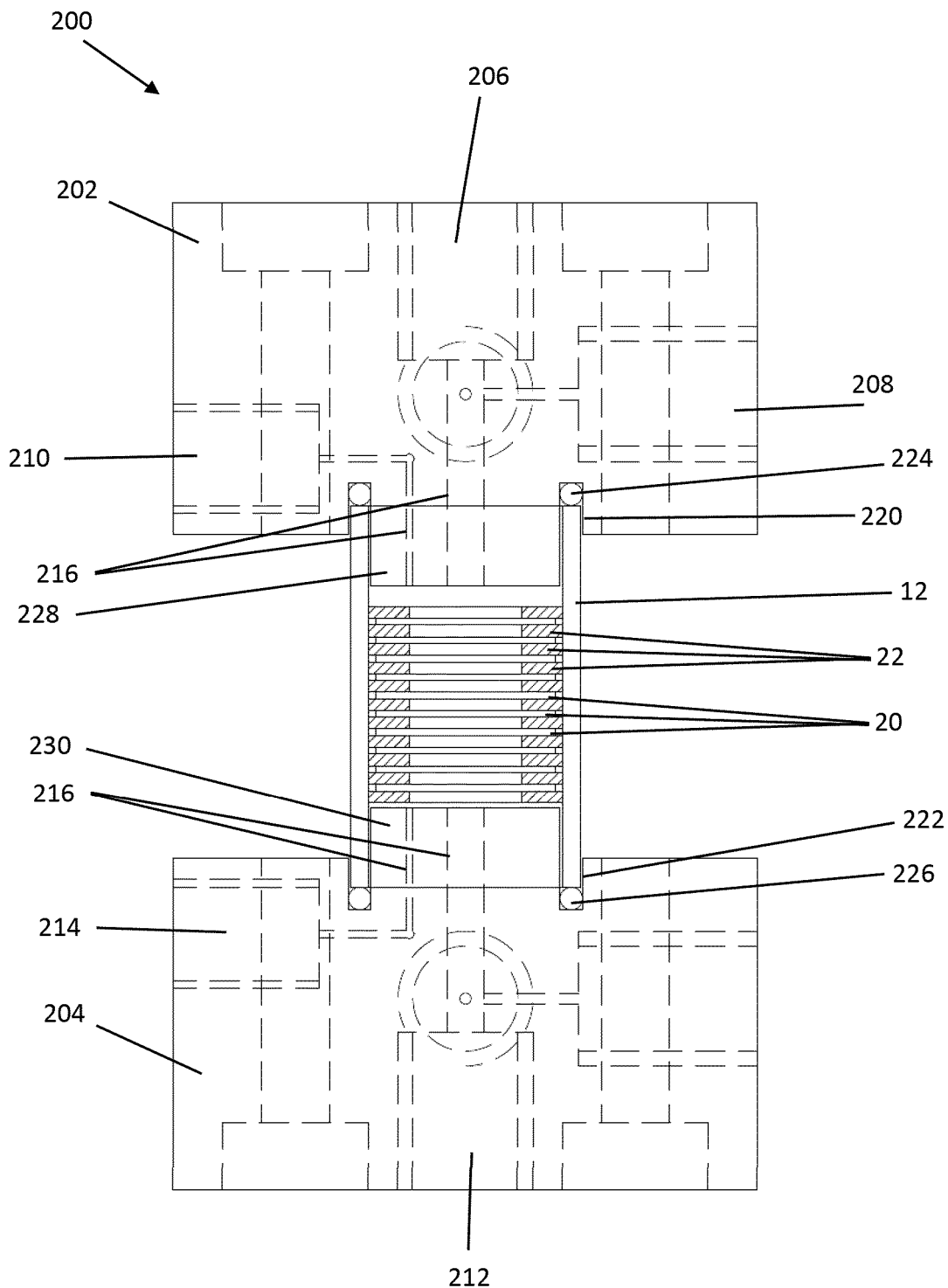
FIG. 5 is a cross-section view of the microfluidic device shown in FIG. 4.

Referring now to FIG. 4-5, a further embodiment of the disclosure is illustrated, with like reference numerals denoting like parts to those of the previous embodiments. The microfluidic device 200 of the embodiment comprises a body 12 of the same form as shown in FIG. 3A-3B. The body 12 is provided between first and second manifold blocks 202, 204 respectively.

The first manifold block 202 has a sample inlet 206, a buffer inlet 208 and an elution outlet 210 formed therein. The second manifold block 202 has a waste outlet 212 and an elution inlet 214 formed therein. Each of the inlets and outlets 206-214 are in fluid communication with the cavity 14 via microfluidic pathways 216 formed in each manifold block 202, 204 as shown in FIG. 5. The manifold blocks 202, 204 of the embodiment are designed to minimize the length of the pathways. In other embodiments other microfluidic functions may be integrated into the manifold blocks 202, 204, such as those described in PCT/GB2006/004569 and PCT/GB2003/003853. Further, the manifold blocks 202, 204 that may incorporate one or more sensors via a suitable channel formed in the manifold block, eg via a multilayer construction of the manifold block. The sensor(s) may be embedded in manifold block 202, 204 and in contact with one of the pathways 216, such as the pathway 216 from the cavity 14 to elution outlet 210. The sensor(s) may be optical, magnetic, thermal, chemical, or other sensors according to requirements. Further heating/cooling devices may be integrated into the manifold blocks 202, 204.

Connectors 218 are threaded into the each manifold block 202, 204 to permit attachment of hoses or other fluid conduits to each inlet and outlet 206-214.

Each manifold block 202, 204 has a recess 220, 222, respectively, formed therein which partially receives the body 12. A gasket 224, 226 is received within each recess 220, 222, respectively, to form a seal between the body 12 and the corresponding manifold block 202, 204.

Each manifold block 202, 204 has a raised portion 228, 230, respectively, that protrudes into the body 12. The meshes 20, and gaskets 22 if any are present, are compressed between the raised portions 228, 230. Compression may assist in flattening meshes 20 into a more planar form.

The microfluidic device 200 may be utilized as a compact, low cost affinity column. A suitable functionalizing material is applied to the outer surface of the meshes 20. Conveniently, the meshes 20 may be functionalized in situ within the microfluidic device 200. For instance, a solution containing a functionalizing material may be passed through the microfluidic device 200 using the sample inlet 206 and the waste outlet 212, following which a wash solution may be passed through the microfluidic device 200.

Figure 6:
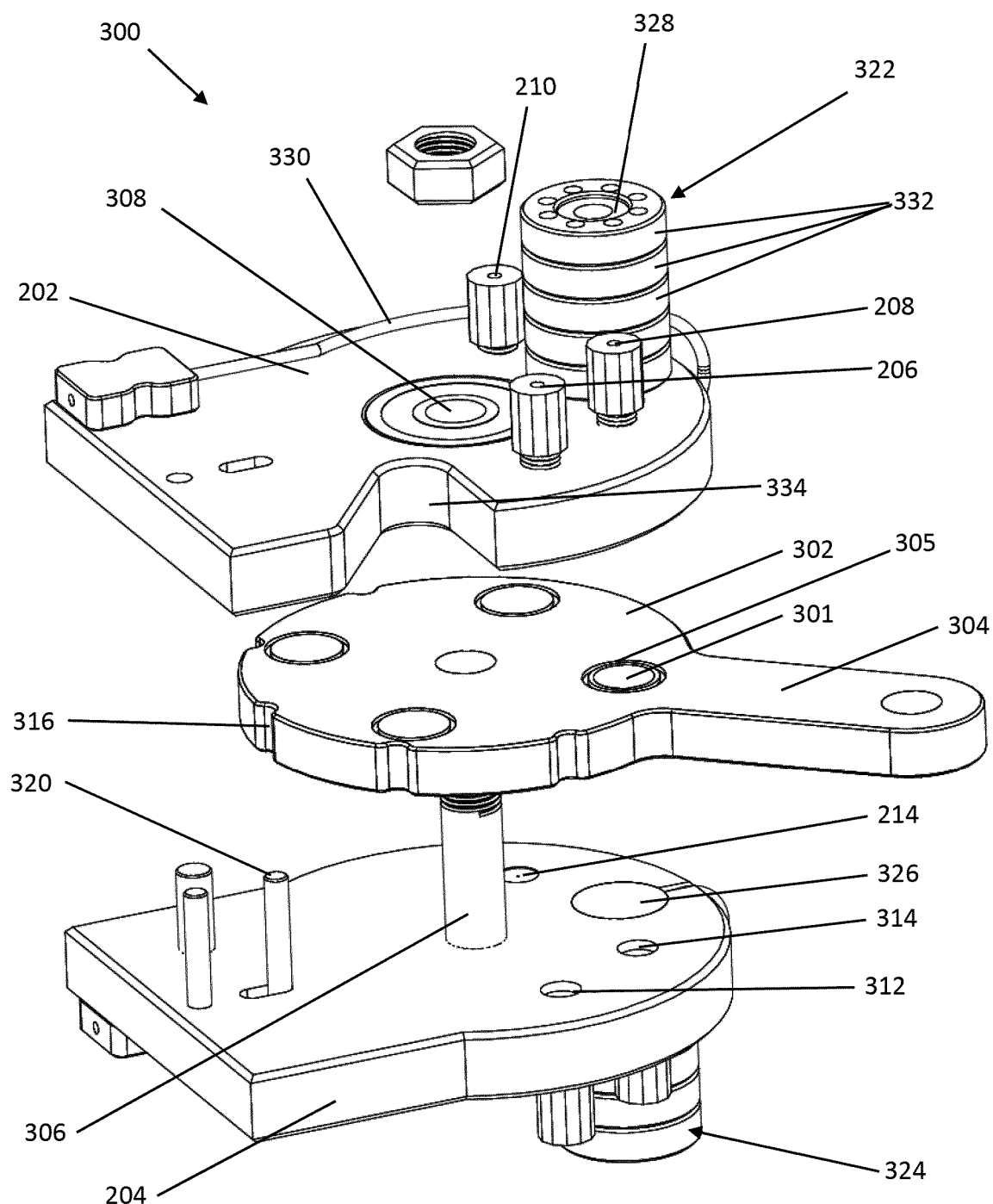
FIG. 6 is an exploded view of a microfluidic device according to another embodiment of the disclosure.
Figure 7:
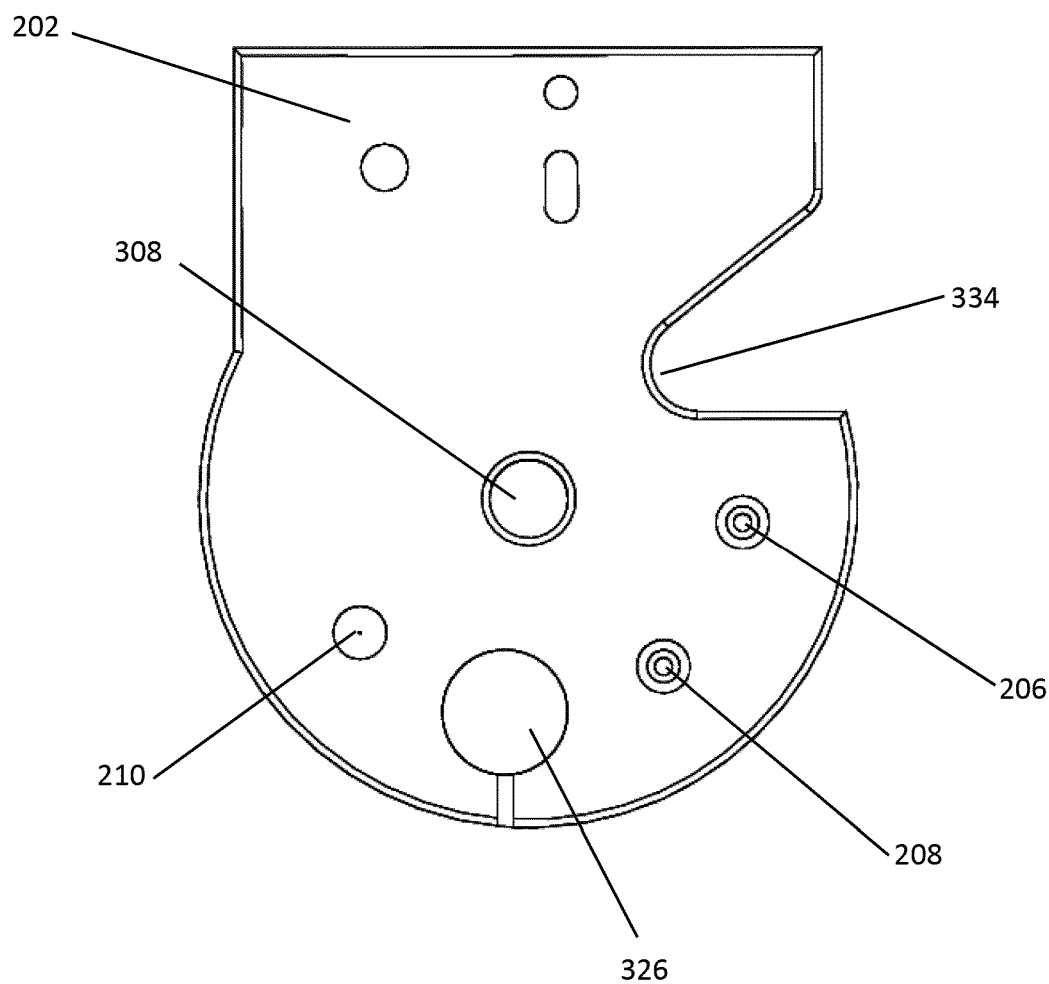
FIG. 7 is an end plan view of the first manifold block of the microfluidic device of FIG. 6.

A further embodiment of the disclosure is illustrated in FIGS. 6 and 7, with like reference numerals denoting like parts to those of the previous embodiments with any differences described below.

In the microfluidic device 300 of the embodiment, the manifold blocks 202, 204 are in the form of plates. The body 12 is received within a hole 301 provided in a guide plate 302 positioned between the manifold blocks 202, 204. The guide plate 302 has a handle 304 which may be used to rotate the guide plate 302 relative to the manifold blocks 202, 204. The guide plate 302 rotates around a spindle 306 projecting from the second manifold block 204.

The first manifold block 202 of the microfluidic device 300 includes a hole 308 though which the spindle 306 passes. The sample inlet 206, buffer inlet 208 and the elution outlet 210 are provided spaced from the spindle 306 in an arc thereabout, as can be seen from FIG. 7.

The second manifold block 204 has a sample outlet 312 and a buffer outlet 314 in place of the waste outlet of the previous embodiment. The sample outlet 312, buffer outlet 314 and the elution inlet 214 provided spaced from the spindle 306 in an arc thereabout in a similar manner to the inlets and outlets in the first manifold block 202.

The microfluidic device 300 has pairs of inlets and outlets, namely a sample pair, a buffer pair and an elution pair. In each inlet and outlet pair, one of the inlet or the outlet is provided in the first manifold block 202 and the other of the inlet or outlet is provided in the second manifold block 204. Each inlet and outlet pair is aligned so the body 12 can be rotated into alignment with each inlet and outlet pair in turn via the guide plate 302.

To assist with registration between the body 12 and each pair, notches 316 are formed in the edge 318 of the guide plate 302. The notches 316 engage a spring-loaded member 320 to provide registration indication to a user.

The microfluidic device 300 includes heating means arranged to selectively heat the body 12 and contents of the cavity 14. As illustrated in the drawings, the heating means of the embodiment includes a first heater 322 provided on the first manifold block 202 and a second heater 324 provided on the second manifold block 204.

Each heater 322, 324 comprises a heating plate 326 from which a hollow column 328 extends. The heating plates 326 and columns 328 are formed of suitable thermally conductive material, such as aluminium. A thermocouple (not shown) may be provided in each heating plate 326 to provide a control signal via cables 330. Insulators 332 are provided around the columns 328. A suitable heating device, such as a cartridge heater, is received within each column 328, and may be controlled according to the control signal.

The first and second heaters form a heating pair. In like manner to the inlet and outlet pairs, the first and second heaters 322, 324 are spaced from the spindle 306. The first and second heaters 322, 324 are also aligned with, the inlet and outlet pairs and the heaters arranged to form the sequence sample pair, buffer pair, heater pair, and elution pair.

The heating plates 326 are provided flush with a surface of the manifold blocks 202, 204 such that when the body 12 is brought into registration with the heaters 322, 324, the heating plates 326 are adjacent to the cavity 14 and in thermal contact with the body 12.

The first manifold block 202 of the microfluidic device 300 has a cutaway portion 334 formed therein. The cutaway portion 334 provides access to the hole 301 in the guide plate 302 when the guide plate 302 is rotated so the hole 301 is in registration with the cutaway portion, so a user may insert, remove or replace the body 12.

Figure 8:
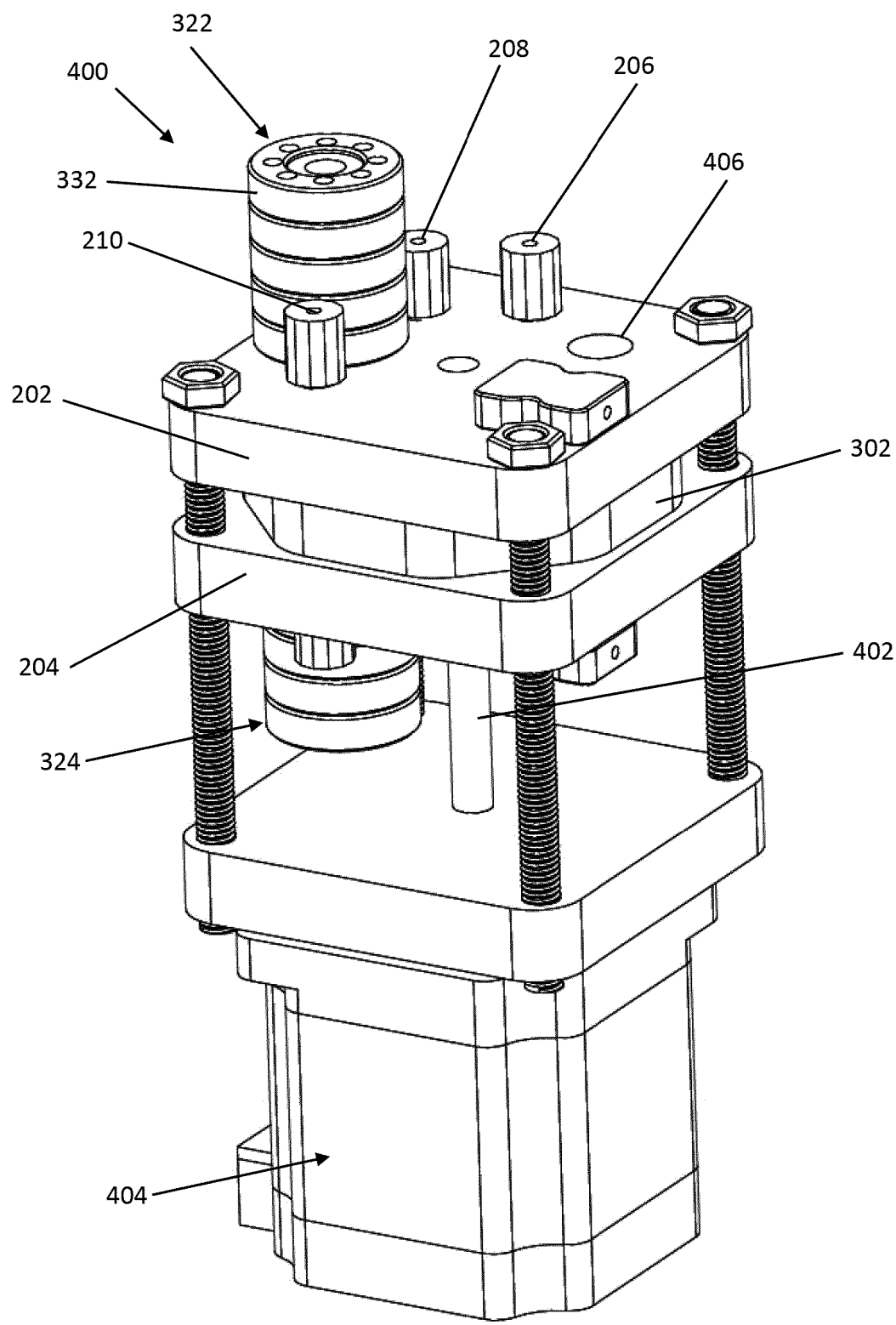
FIG. 8 is a perspective view of a microfluidic device according to another embodiment of the invention.
Figure 9:
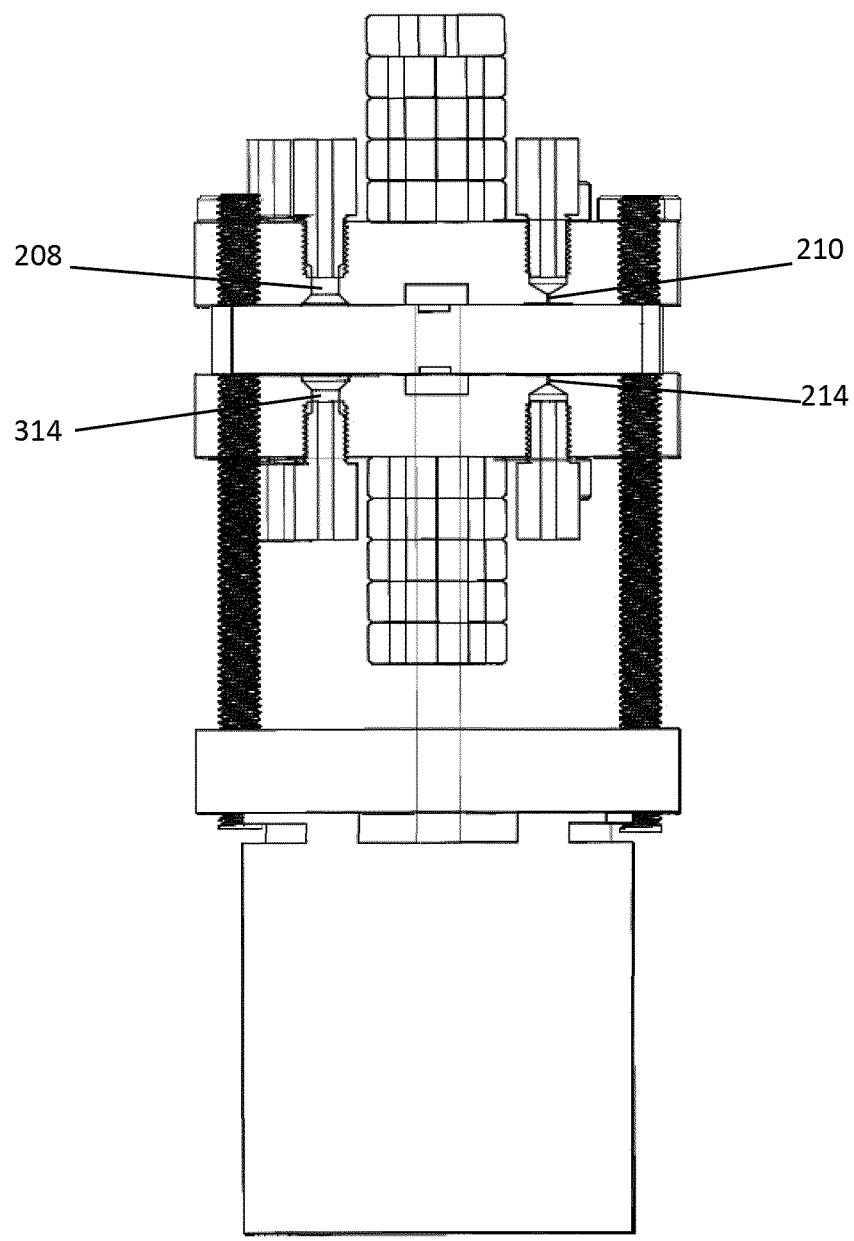
FIG. 9 is a cross-section view of the microfluidic device of FIG. 8 showing inlet and outlet details.
Figure 10:
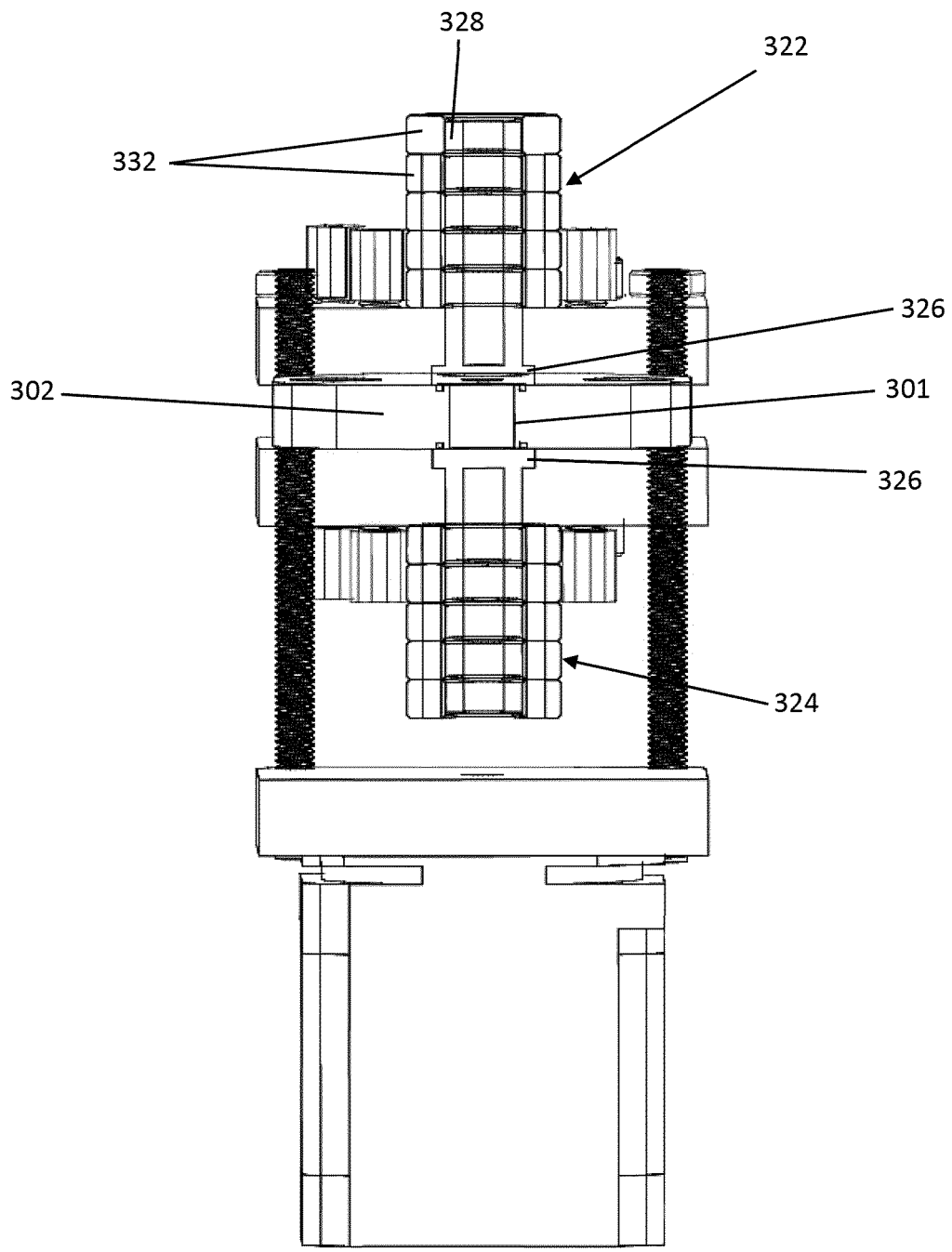
FIG. 10 is a cross-section view of the microfluidic device of FIG. 8 showing the heaters.

A further embodiment of the disclosure is illustrated in FIG. 8-10, with like reference numerals denoting like parts to those of the previous embodiments with any differences described below.

In the microfluidic device 400 of the embodiment is similar to the microfluidic device 300 shown in FIGS. 6 & 7. However, in the microfluidic device 400, the guide plate 302 does not have a handle. The spindle of the previous embodiment is replaced with a shaft 402 that engages with and rotates the guide plate 302. The shaft 402 is driven by a motor 404, such as a stepper motor. The first manifold block 202 of the microfluidic device 400 has an aperture 406 in place of the cutaway portion of the previous embodiment. In a similar manner to the manifold block 202 of the device 300, the first manifold block 202 of the microfluidic device 400 may have microfluidic functionality integrated into it, such as sensors and heating/cooling devices.

FIG. 9 shows detail of the buffer inlet 208, buffer outlet 314, elution inlet 214 and elution outlet 210 in cross-section. As shown the buffer inlet and outlet 208, 314 are relatively wide to permit fast fluid flow therethrough. The sample inlet and outlet 206, 312 are similarly sized to the buffer inlet 208 and buffer outlet 314. In contrast the elution inlet and outlet 214, 210 include a narrow neck to provide a more controlled flow therethrough during elution of the cavity 14.

FIG. 10 shows detail of the heaters 322, 324, and illustrates that when the guide plate 302 is brought into registration with the heaters 322, 324, the heating plates 326 are adjacent to the hole 301 so as to be in thermal contact with the body 12 provided in the hole 301. The proximity of the heating plates to the body 12 permits rapid heating of the contents of the cavity 14, as described in more detail in the examples below.

The microfluidic device 400 provides a compact system for performing liquid chromatography in a microfluidic form. The following examples provide results of tests performed using microfluidic devices according to this disclosure. The examples are described with reference to the embodiments shown in FIG. 6-7, although the device shown in FIG. 8-10 could also be used. The embodiment shown in FIG. 4-5 would also be suitable for use in the examples, however rather than movement to a position as described below, use of the inlets and outlets of the device 200 corresponding to the position would be used.

To prepare the device, the guide plate 302 is rotated so the hole 301 is in registration with the cutaway portion 334. A body 12 is inserted into the hole 301, which in the examples contains six stacks 28 each consisting of twenty meshes 20 arranged as shown in FIG. 2A, though other arrangements may be used.

Once the body 12 is received in the hole 301, the guide plate 302 is rotated to a first position in which the body 12 aligned with the sample inlet and outlet 206, 208. The body 12 is then primed with water at a flow rate of 1-100 mL/min.

Once primed, if the meshes 20 have not been functionalized prior to insertion into the device, the meshes 20 are then functionalized by passing a solution containing a functionalizing group through the body 12 using the sample inlet and outlet 206, 208. In the example, the meshes 20 were formed of nickel. Functionalizing may include coating the outer surfaces 26 of the meshes 20 by treatment with organic coupling agents with good binding properties to the mesh material. In the case of Ni and Nickel oxide, such coupling agents include catechols and gallates functionalized with moieties such as PEG, hydrocarbon chains (such as stearyl gallate) and functionalized with groups that that will react with antigens including peptide epitopes, aptamers and antibodies synthesized using recombinant protein expression in *Escherichia coli* antibodies attached to the coupling agents via an epoxy groups or other groups used for binding to aminoacids acids including coating formulations comprising dimer, trimers, monomers, oligomers and polymers including synthetic and naturally occurring polymers containing catechols such as mussel adhesive protein (as described in U.S. Pat. No. 5,817,470).

Another example of a functionalizing material is polymer syntheses using DOPA and dopamine derivatives as a means of imparting the adhesive properties of mussel foot protein into synthetic polymers. Acetonide-protected dopamine methacrylamide (ADMA) may be used as a monomer in the synthesis of copolymers using free radical and reverse addition-fragmentation chain transfer (RAFT) polymerization. Various co-monomers were investigated, and methyl methacrylate, stearyl methacrylate and glycidyl methacrylate all formed copolymers with ADMA. The co-monomer is chosen to provide attachment to a suitable functional group that has affinity with the analyte, such as peptide epitopes, aptamers and antibodies.

Other suitable functionalizing materials include those used in solid phase extraction for HPLC and for immuno-affinity columns for bioassays. Further functionalizing materials include self-ordering materials such as lipids and liquid crystals; and proteins such as caseins and bovine serum albumin BSA used as blocking agents for spacing antigens.

The functionalizing material is chosen to provide affinity to the analyte of interest. In the examples, the meshes 20 were functionalized for affinity to aflatoxin using a functionalizing material of mussel adhesive protein or polymer syntheses using DOPA and dopamine derivatives. After functionalizing, the meshes 20 may be washed by passing a buffer solution through the sample inlet and outlet 206, 208.

Next, a solution that may contain the analyte of interest is passed through the body 12 at a flow rate of 1-100 mL/min. In the example, the body 12 defined a cavity 14 having a 150 μL volume, in which case a flow of 1.5 mL/min would provide ten evacuations in 1 minute. It has been found that increasing the flow rate results in a corresponding increase in back pressure in the body 12 due to flow resistance from the meshes 20. This back pressure may assist with capture of the analyte by the meshes 20 since the pressure encourages lateral flow across the meshes as well as through the meshes. In the example, 50-100 mL of solution was passed through the body 12. In some cases, the solution may be pre-treated to remove substances that may interfere with operation of the device. In the case of detection of aflatoxin in milk, the solution consists of 50-100 mL of milk that has had fat globules removed, for instance using a cross-flow filtration device. Once the solution has been passed through the body 12, the meshes 20 are then washed with a buffer solution.

The guide plate 302 is then rotated to a second position in which the body 12 aligned with the heating plates 326. A gasket (not shown) is provided in a recess 305 that surrounds the hole 301 on each surface of the guide plate 302 to form a seal with the first and second manifold blocks 202, 204. Power is supplied to the heaters 322, 324 to heat the buffer in the cavity 14 and release the analyte from the meshes 20.

The small volume of the cavity 14 results in heating occurring at a rate of 1° C./sec. In the case of aflatoxin, heating is performed to achieve a temperature of 62° C. to release the aflatoxin from the surface mounted antibody and into the buffer in the cavity 14. Heating from 22-62° C. occurs quickly, in around 40 seconds. The guide plate is maintained in this position with the cavity temperature controlled at the desired value for a period of time sufficient to allow the release of the maximum amount of antibody into the buffer. The choice of temperature and time will be informed by the release properties of the surface mounted antibody or other surface treatment used to provide affinity.

The guide plate 302 is then rotated to a third position in which the body 12 is aligned with the elution inlet and outlet 214, 210. The buffer and analyte is then eluted from the device with a now higher concentration of analyte, typically to detector. Elution is typically performed at a desired flow rate which can be low or high, typically 10-20 µL/s. Elution may be achieved by pumping a gas or buffer liquid. Any suitable detector may be used according to the analyte of interest. During elution the heating plates 326 cools at a rate of 10° C./min ready for the next sample, though this time could be reduced using cooling.

The devices in this example concentrated the aflatoxin to a range that permits detection, for instance using an ELISA (enzyme linked immunosorbent assay) analysis.

Table 2 below shows the concentration results achieved in eight example configurations.

TABLE 2

| Example | Initial AFM concentration | flow rate ml/min | Final AFM concentration | concentration factor |
|---|---|---|---|---|
| A | 209 | ~100 | 599 | 2.9 |
| B | 209 | 1.35 | 4265 | 20.4 |
| C | 54 | ~100 | 201 | 3.7 |
| D | 54 | 1.1 | 1286 | 23.8 |
| E | 58 | 1.0 | 2414 | 41.7 |
| F | 58 | 0.6 | 3030 | 52.4 |
| G | 58 | 1.9 | 2652 | 45.9 |
| H | 73 | 1.0 | 585 | 8.0 |

Table 3 below shows the mesh configurations used in each of the example configurations shown in Table 2.

TABLE 3

| Example | 50-10 | 100-20 | 150-30 | Total meshes per stack | No of Stacks | Total meshes | Mesh area cm2 |
|---|---|---|---|---|---|---|---|
| A | 14 | 0 | 13 | 27 | 6 | 162 | 34 |
| B | 14 | 0 | 13 | 27 | 6 | 162 | 34 |
| C | 14 | 0 | 13 | 27 | 6 | 162 | 34 |
| D | 14 | 0 | 13 | 27 | 6 | 162 | 34 |
| E | 33 | 0 | 32 | 65 | 5 | 325 | 69.5 |
| F | 33 | 0 | 32 | 65 | 5 | 325 | 69.5 |
| G | 33 | 0 | 32 | 65 | 5 | 325 | 69.5 |
| H | 0 | 22 | 17 | 39 | 10 | 390 | 94 |

Depending on the application the concentration factor may be increased by replacing some or all of the gaskets 22 with more meshes. In addition, as the examples in tables 2 and 3 show, the flow rate also influences analyte concentration, with lower flow rates providing increased concentration of the analyte. However, low flow rates also increase the time to pass the solution through the device. The number of meshes 20, the volume of the body, the time at which the cavity is held at the release temperature, and the flow rate may be optimized for the test conditions and desired analyte concentration. A 10-fold increase in concentration beyond that shown in Table 2 is expected to be achievable by suitable optimization.

Desirably each processes would be undertaken a few minutes to provide an overall assay time of less than 20 minutes. In one arrangement, the pumps used to pass buffer and solution through the device 200 were syringe pumps, providing a low cost chromatography system that could be used in field locations such as dairy farms.

While the examples above have been described with reference to the device 200 of FIG. 6-7, it will be appreciated that the device 300 of FIG. 8-10 may also be used, in which case the steps of rotating the guide plate 302 may be performed by the motor 404. Further, the device may be connected to sources of buffer, solution, etc and the process may be automated with suitable control systems and process sensors.

The embodiments illustrated in FIGS. 6-10 show configurations using a single body 12 that is rotated. In other configurations, devices having multiple bodies 12 may be provided. In addition, devices employing linear movement rather than rotational movement may be provided.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

Wherever the term comprising is used herein, we also contemplate options wherein the terms "consisting of" or "consisting essentially of" are used instead.

Wherever the term "polymer" is used herein, we also contemplate the term including oligomers, such as dimers, trimers, tetramers etc.

The invention claimed is:

1. A microfluidic device having a cavity defining microfluidic volume, comprising:
a plurality of meshes provided in the cavity, each mesh having a plurality of apertures and an outer surface;
the plurality of meshes arranged in a layered configuration with the apertures of adjacent layers offset with respect to one another to define a plurality of circuitous pathways therethrough, wherein the apertures in each mesh are arranged in a grid, whereby the grid of one mesh is rotated with respect to the grid of an adjacent mesh;
the outer surface of each mesh having a functionalizing material applied thereto;
wherein each mesh is formed of nickel.

2. The microfluidic device of claim 1, wherein a ratio of a surface area of the outer surface of the mesh to the microfluidic volume is in the region of 20-4000 mm$^{-1}$.

3. The microfluidic device of claim 1, wherein the mesh is formed into a spiral to form the layered configuration.

4. The microfluidic device of claim 1, further comprising a plurality of groups of meshes, each group of meshes have a different functionalizing material applied thereto.

5. The microfluidic device of claim 1, wherein the plurality of meshes is comprised of a first mesh having a first pitch and a first aperture size, and a second mesh having a second pitch and a second aperture size, wherein the first and second meshes are interleaved.

6. The microfluidic device of claim 5, wherein the plurality of meshes is further comprised of a third mesh having a third pitch and a third aperture size, the first, second and third meshes being interleaved.

7. The microfluidic device of claim 1, wherein each mesh comprises a plurality of apertures having a ranges of sizes and shapes.

8. The microfluidic device of claim 1, wherein the plurality of meshes is formed into a stack.

9. The microfluidic device of claim 8, further comprising a plurality of stacks, the stacks being held apart by spacing elements provided between the stacks.

10. The microfluidic device of claim 9, wherein each stack comprises at least 15 meshes.

11. The microfluidic device of claim 1, wherein the cavity defines a microfluidic volume of 5-500 µL.

12. The microfluidic device of claim 1, wherein the functionalizing material comprises a coupling agent comprising at least one of catechols and gallates and derivatives thereof functionalized with moieties comprising PEG, hydrocarbon chains including stearyl gallate, and functionalized with groups that that will react with antigens including peptide epitopes, aptamers and antibodies synthesized using recombinant protein expression in *Escherichia coli*, antibodies attached to the coupling agents via an epoxy groups or other groups used for binding to amino acids.

13. The microfluidic device of claim 1 wherein the functionalizing material comprises a copolymer synthesized using DOPA and dopamine derivatives comprising at least one of Acetonide-protected dopamine methacrylamide (ADMA) and a co-monomer selected from the group consisting of: methyl methacrylate, stearyl methacrylate and glycidyl methacrylate, hydroxyethyl methacrylate and polyethyleneglycol methacrylate, the co-monomer being chosen to provide attachment to a suitable functional group that has affinity with a target analyte comprising at least one of peptide epitopes, aptamers and antibodies.

14. The microfluidic device of claim 1 wherein the functionalizing material comprises self-ordering materials including at least one of lipids and liquid crystals, in combination with and proteins comprising at least one of caseins and bovine serum albumin (BSA) used as blocking agents for spacing antigens.

15. The microfluidic device of claim 1, further comprising:
first and second manifold blocks;
a body provided between the manifold blocks, the cavity being provided in the body;
at least two inlets and at least two outlets provided in the manifold blocks, the inlets and outlets being in fluid communication with the cavity via microfluidic pathways.

16. The microfluidic device of claim 15, further comprising heating means provided adjacent to the cavity.

17. The microfluidic device of claim 16, wherein the heating means comprises first and second heaters provided in the first and second manifold blocks, respectively, each heater having a corresponding heating plate provided in the first and second manifold blocks, the heating plates being in thermal contact with the body.

18. The microfluidic device of claim 15, wherein the inlets and outlets are provided in pairs comprising one inlet and one outlet, one of the inlet and the outlet in each pair provided in the first manifold block and the other provided in the second manifold block, the inlet and the outlet in each pair being aligned, the body being movable between each aligned pair.

19. The microfluidic device of claim 15, wherein the manifold block includes at least one sensor integrated therein.

20. The microfluidic device of claim 18, wherein the inlets comprise a sample inlet, a buffer inlet and an elution inlet, and the outlets comprise a sample outlet, a buffer outlet and an elution outlet, to provide a sample pair, a buffer pair and an elution pair.

21. The microfluidic device of claim 17, wherein first and second heaters are also aligned, the inlet and outlet pairs and the heaters arranged to form the sequence sample pair, buffer pair, heaters, and elution.

22. The microfluidic device of claim 20, wherein the sample inlet, buffer inlet and elution outlet are provided in the first manifold block and the sample outlet, buffer outlet and elution inlet are provided in the second manifold block.

23. The microfluidic device of claim 1, wherein the plurality of apertures are arranged across an entirety of the mesh.

* * * * *